Nov. 14, 1967  L. H. GILLICK  3,352,224
VENTILATING AND AIR CONDITIONING SYSTEM FOR A PASSENGER VEHICLE
Filed Jan. 14, 1966
4 Sheets-Sheet 1
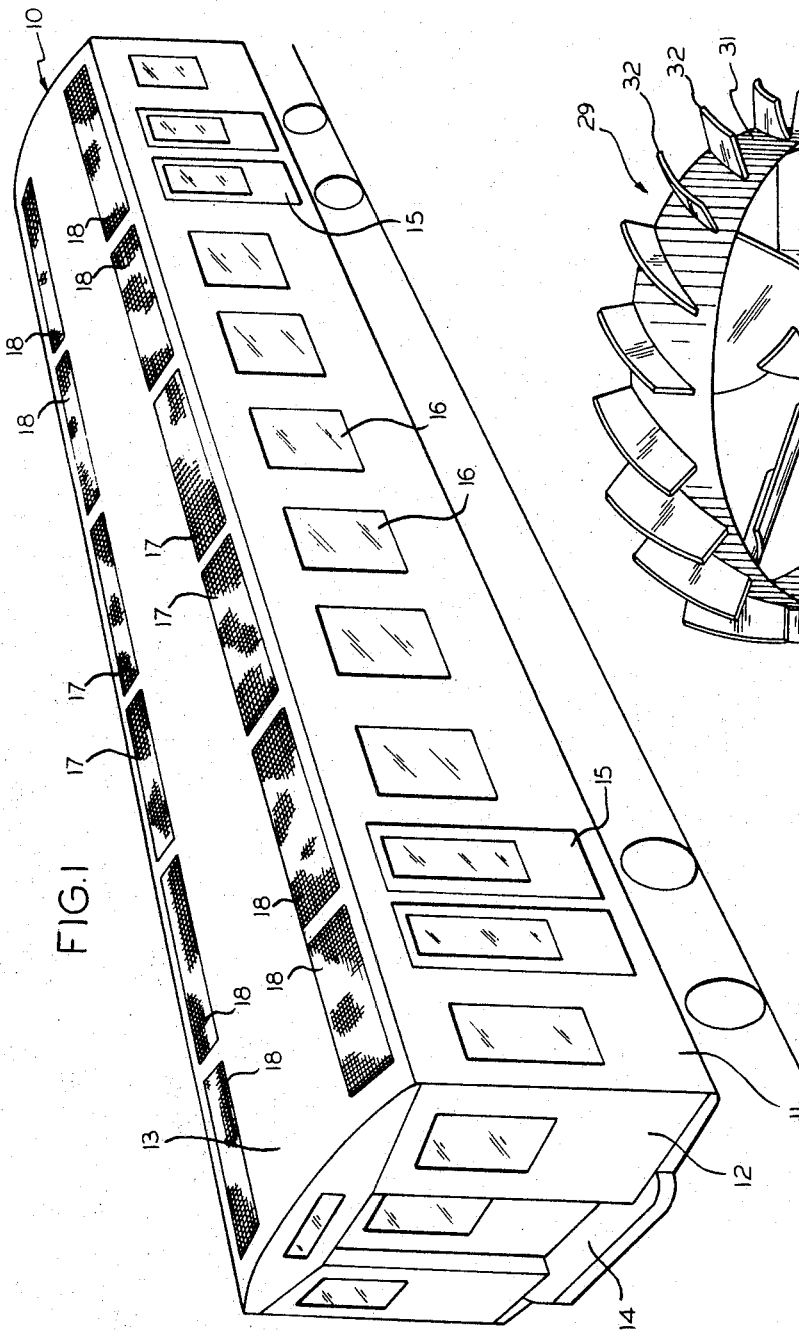
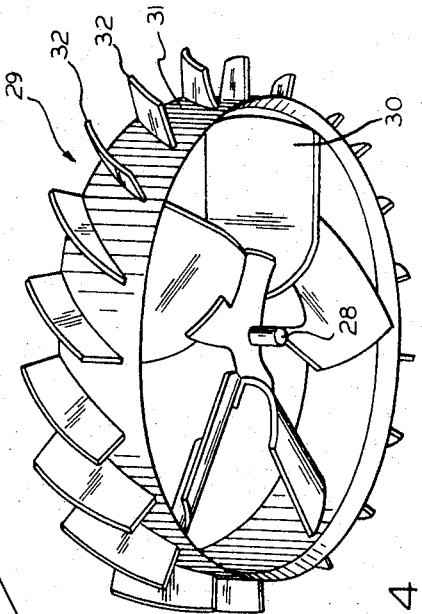
INVENTOR
LAURANCE H. GILLICK
BY
ATTORNEY

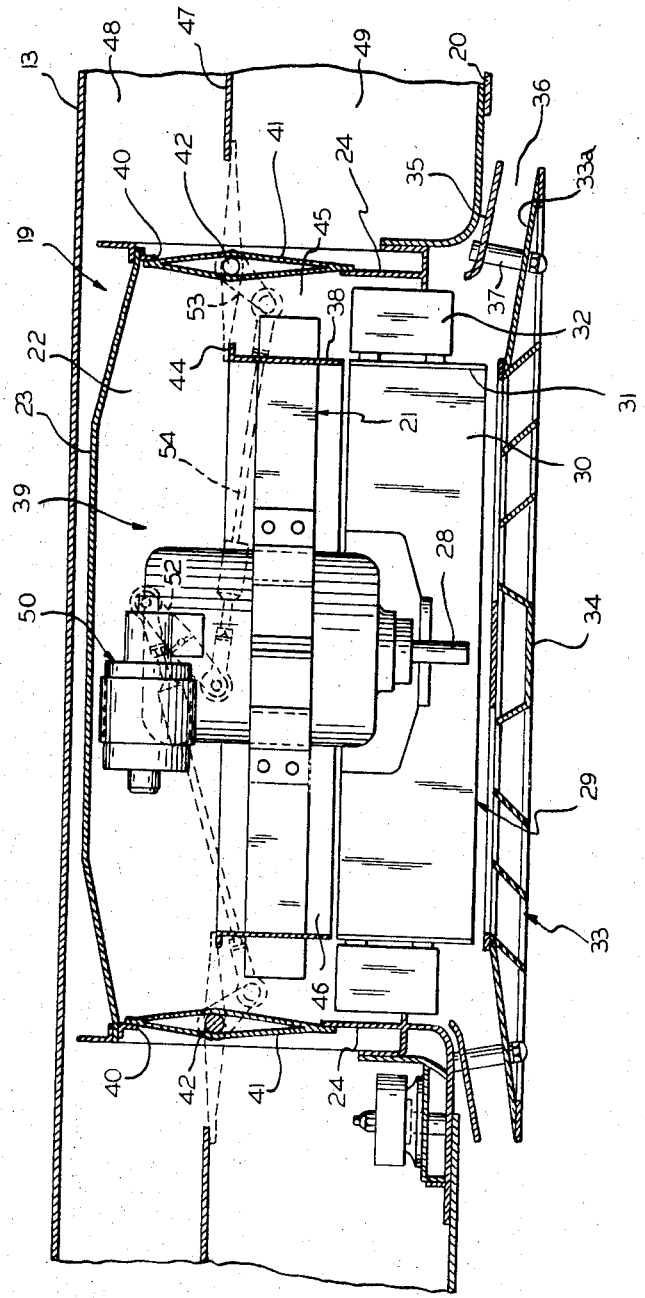

Nov. 14, 1967 L. H. GILLICK 3,352,224
VENTILATING AND AIR CONDITIONING SYSTEM FOR A PASSENGER VEHICLE
Filed Jan. 14, 1966
4 Sheets-Sheet 3

INVENTOR
LAURANCE H. GILLICK
BY
ATTORNEY

Nov. 14, 1967    L. H. GILLICK    3,352,224
VENTILATING AND AIR CONDITIONING SYSTEM FOR A PASSENGER VEHICLE
Filed Jan. 14, 1966    4 Sheets-Sheet 4

INVENTOR
LAURANCE H. GILLICK
BY
ATTORNEY

United States Patent Office 3,352,224
Patented Nov. 14, 1967

3,352,224
VENTILATING AND AIR CONDITIONING SYSTEM
FOR A PASSENGER VEHICLE
Laurance H. Gillick, Wilmette, Ill., assignor to Vapor
Corporation, Chicago, Ill., a corporation of Delaware
Filed Jan. 14, 1966, Ser. No. 520,702
12 Claims. (Cl. 98—10)

ABSTRACT OF THE DISCLOSURE

A ventilating and air conditioning system for a passenger vehicle including a dual flow fan mounted in the ceiling coacting with duct means communicating with the ambient and the passenger compartment to ventilate and/or condition the air in the passenger compartment.

---

This invention relates in general to a system of ventilating or conditioning the air in a vehicle, and more particularly to a ventilating and air conditioning unit adapted to be employed in passenger carrying vehicles such as streetcars and the like, although other uses and purposes will be apparent to one skilled in the art.

The ventilating and air conditioning unit of the present invention includes a dual flow fan unit mounted in the ceiling of a vehicle that is capable of ventilating the interior of the vehicle by exhausting air from within the vehicle and replacing it with fresh air, and of air conditioning the air within the vehicle by recycling same over a suitable heat exchanger. The fan unit includes an intake and a discharge communicating with a plenum chamber in which may be mounted any suitable heat exchanger device. A damper arrangement provides intercommunication between the intake and an exhaust, and intercommunication between the discharge and a fresh air intake. Suitable temperature responsive controls may be employed for operation of the damper arrangement. Because a dual flow fan blade is employed, only a single motor need be provided for operating the unit to obtain both intake and discharge of air.

Accordingly, it is an object of this invention to provide an improved ventilating and air conditioning system for a vehicle.

Another object of the present invention is in the provision of a ventilating and air conditioning unit for a vehicle that may be mounted in the ceiling and roof of a vehicle in a compact package, and that will eliminate a ducting system within the vehicle for air distribution.

Still another object of this invention resides in the provision of a system for ventilating and air conditioning a passenger carrying vehicle that includes a fan unit having a dual effect fan blade for moving air in two different directions, thereby eliminating the necessity of two fans, motors and associated controls.

A further object of this invention is in the provision of a system for ventilating and heating of passenger carrying vehicles such as subway cars that eliminates the need of a ducting system and eliminates the need for opening windows in the vehicle for the flow of fresh air.

Other objects, features and advantages of the invention will be apparent from the following detailed disclosure, taken in conjunction with the accompanying sheets of drawings, wherein like reference numerals refer to like parts, in which:

FIG. 1 is a perspective view of a vehicle having the system for ventilating and air conditioning in accordance with the present invention;

FIG. 2 is a transverse sectional view taken along the vertical and through a unit for ventilating and air conditioning a vehicle in accordance with the present invention and as would be employed in the vehicle of FIG. 1;

FIG. 4 is a perspective view of the dual flow fan blade employed in the unit of FIGS. 2 and 3;

Figure 3:
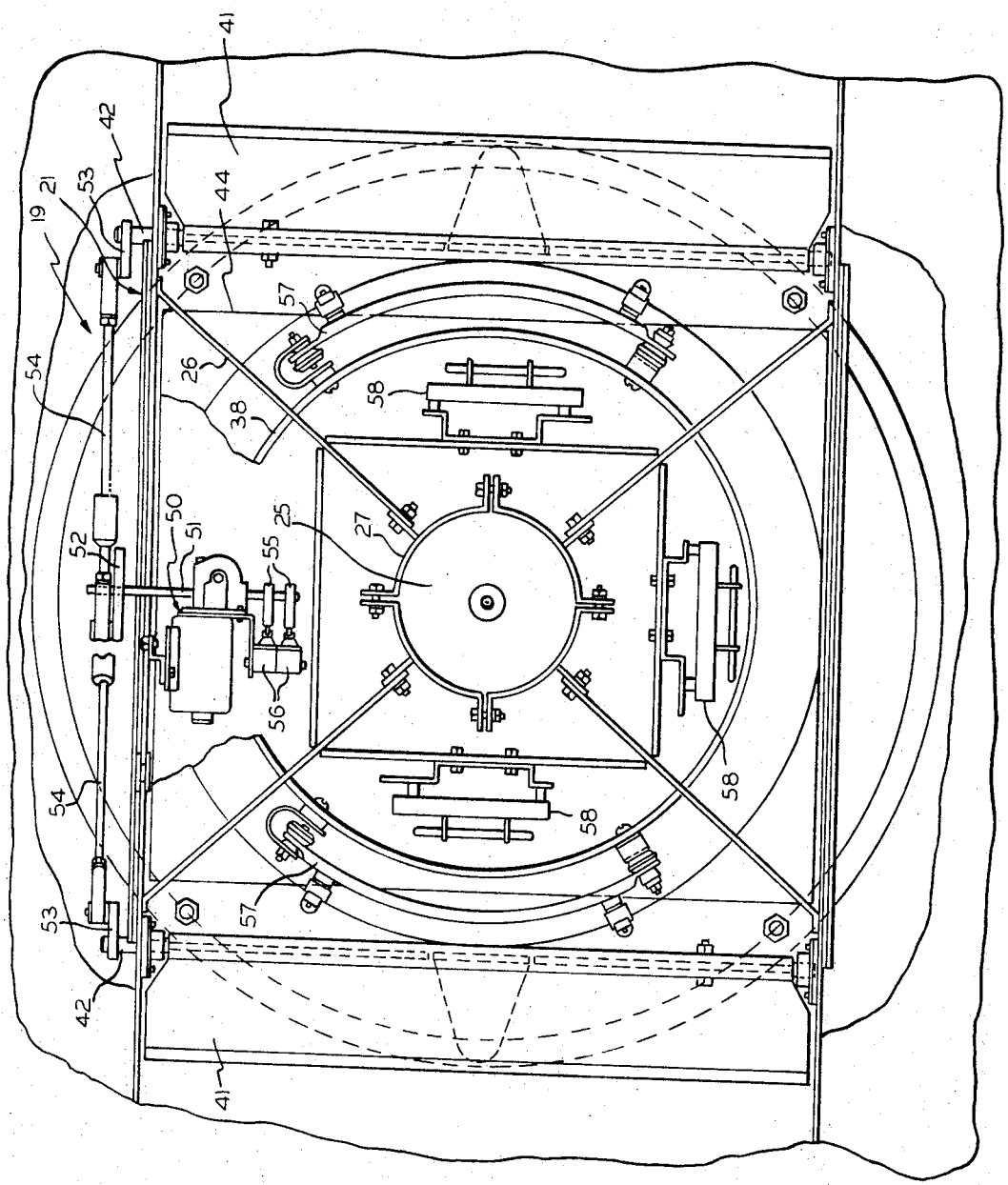
FIG. 3 is a top plan view of the unit of FIG. 2, with some parts removed and other parts broken away for purposes of clarity, and some parts shown out of position.

Referring now to the drawings, and particularly to FIG. 1, a vehicle 10, in the form of a subway car for purposes of illustrating the present invention, includes opposite side walls 11, opposite end walls 12, a roof 13 and a floor 14. Doors 15 are provided in opposite ends of the side walls 11 for permitting the ingress and egress of passengers, and windows 16 are also provided in the side walls. Along opposite side edges of the roof are provided a plurality of fresh air intake openings 17 and exhaust openings 18 for intercommunication with the ventilating and air conditioning unit of the present invention as will be more clearly hereinafter explained. The ventilating and air conditioning unit, as mounted in the roof and ceiling of the vehicle in FIG. 1, is generally designated by the numeral 19, FIGS. 2 and 3, and is shown as being mounted in the roof and ceiling 20 of the vehicle. The unit is preferably mounted between the roof and ceiling as shown in FIG. 2. The unit includes generally a frame 21 supporting opposite side walls 22, a cover 23, and opposite end walls 24. A motor 25 is supported centrally of the unit by X-shaped braces 26 and cylindrical strapping 27. The motor includes a shaft 28 having mounted thereon a dual flow fan blade 29.

The dual flow fan blade 29 includes blades 30 pitched to exhaust air from within the vehicle, an annular wall 31 secured to the periphery of the blades 30, and a series of blades 32 pitched to discharge air into the vehicle compartment and which are mounted on the exterior of the wall 31. Thus, the blades 30 may be considered intake blades for the unit for exhaust purposes and the blades 32 may be considered discharge blades. Mounted directly below the fan blade 29 is a louvered intake register 33 that is essentially round, and which coacts with the intake blades 30 to provide a fan intake 34 at the center of the unit. An annular somewhat flared deflector 35 coacts with the somewhat frusto-conical plate 33a of the louvered register 33 to define a discharge opening 36 that is aligned with the discharge blades 32 of the fan blade 29 for discharging air into the passenger compartment. The deflector 35 is supported from the frame, and carries hangers 37 that support the louvered register 33.

A cylindrical wall 38 is supported above the fan blade 29 and aligned with the fan blade wall 31 to define a passage for the vehicle intake air and to coact with the end walls 24 to define a passage for the discharge air. A plenum chamber 39 is defined at the upper end of the fan unit and into which the intake air is driven by the intake blades 30 of the fan blade 29. Thus the fan intake opening 34 is always in communication with the plenum chamber 39.

Elongated openings 40 are provided in the opposite end walls 24, and which are closed by cycling dampers 41 which are pivotally mounted on shafts 42. The openings extend above and below a separating plate 44 that is mounted at the upper edge of the cylindrical wall 38 about the periphery thereof, and rectangularly shaped as shown in FIG. 3. The dampers 41, when in closed position as shown in solid lines in FIG. 2, coact with the wall 38 to define a discharge passageway 45 that communicates with the plenum chamber 39. Thus, with the dampers 41 in closed position, air is recirculated wherein the movement of the air is through the fan intake opening 34, the intake passageway 46, the plenum chamber 39, the discharge passageway 45, and the discharge opening 36.

When the dampers 41 are open, they assume the position shown in dotted lines in FIG. 2, wherein the upper ends of the dampers slightly overlap the opposite edges of the separating plate 44 and the lower edges of the dampers slightly overlap a partition wall 47 that separates exhaust ducting 48 from fresh air intake ducting 49. The exhaust ducting 48 is connected to the exhaust air openings 18, while the fresh air intake ducting 49 is in communication with the fresh air intake openings 17.

With the dampers in open position, they serve to intercommunicate the plenum chamber 39 and intake passageway 46 and the fan intake opening 34 with the exhaust ducting 48 and exhaust air openings 18, and further intercommunicate the discharge passageway 45 and the fan discharge opening 36 with the fresh air intake ducting 49 and the fresh air intake openings 17. Thus, with the dampers in open position, the ventilating cycle enables complete ventilation of the interior of the passenger vehicle.

A motor and gear reducer unit 50 is mounted on the frame above the separating plate 44 for opening, closing and modulating if desired the dampers 41. The motor and gear reducer assembly includes a drive shaft 51 having a double-ended crank arm 52 mounted thereon and interconnected with crank arms 53 carried on the damper shafts 42 by means of connecting rods 54. The motor and gear reducer assembly being reversible thereby opens and closes the dampers by driving the shaft 51 in opposite directions. To provide further control of the motor and gear reducer assembly, cams 55 are mounted on the drive shaft 51 for operating of the switches 56 in any desired manner.

During the recirculating cycle, when the dampers 41 are closed, it is usually desirous to condition the recirculated air. In this regard, when it is desired to heat the air, electrical heating strips 57 mounted on the wall 38 in the discharge passageway 45 may be energized to heat the air prior to discharge through the fan discharge opening 36. While the heater strips are shown mounted in the discharge passageway 45, they could be mounted in the plenum chamber 39 or the intake passageway 46. Further, while the present invention is primarily illustrated with heater strips as heat exchangers, it should be appreciated that a heat exchanger for cooling air could also be employed if that be necessary. It is intended that the ventilating cycle will substantially take the place of the need for cooling of air.

In order to provide better temperature control of the unit, one or more thermostats 58 may be interconnected with the heater strips 57 and the damper operator 50 so that the operation of the unit through the heating and ventilating cycles is responsive to the thermostats.

Figure 5:
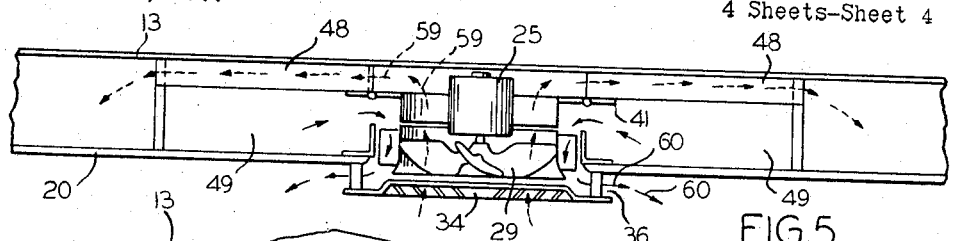
FIG. 5 is a somewhat diagrammatic view illustrating the unit of the present invention while operating in the ventilating cycle.
Figure 6:
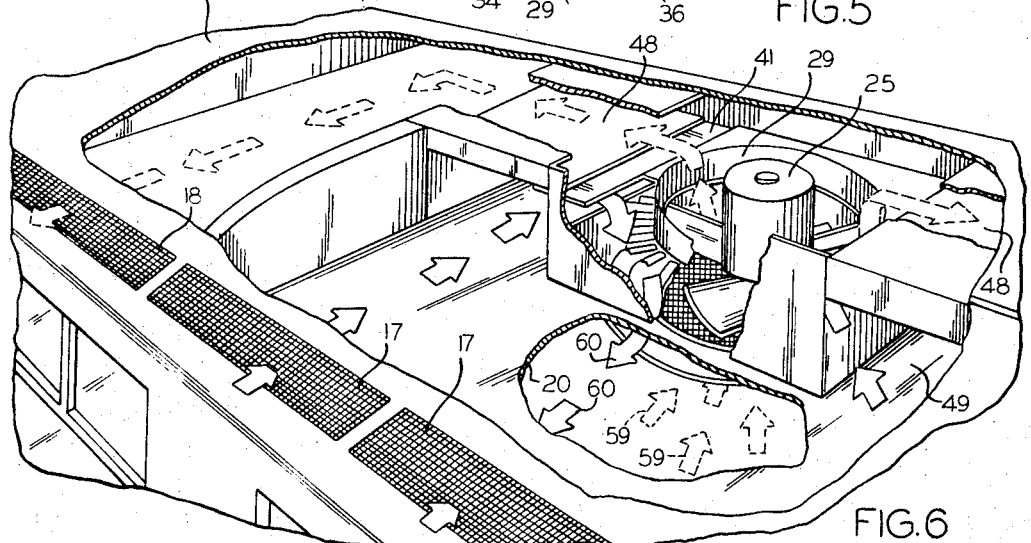
FIG. 6 is a perspective view of the unit with parts broken away for purposes of clarity and as shown in the roof and ceiling of a vehicle, also illustrating the ventilating cycle.
Figure 7:
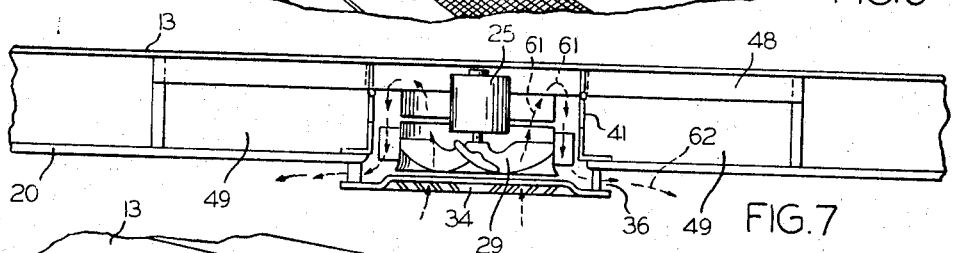
FIG. 7 is a diagrammatic view of the unit of the present invention and illustrating the recirculating cycle.
Figure 8:
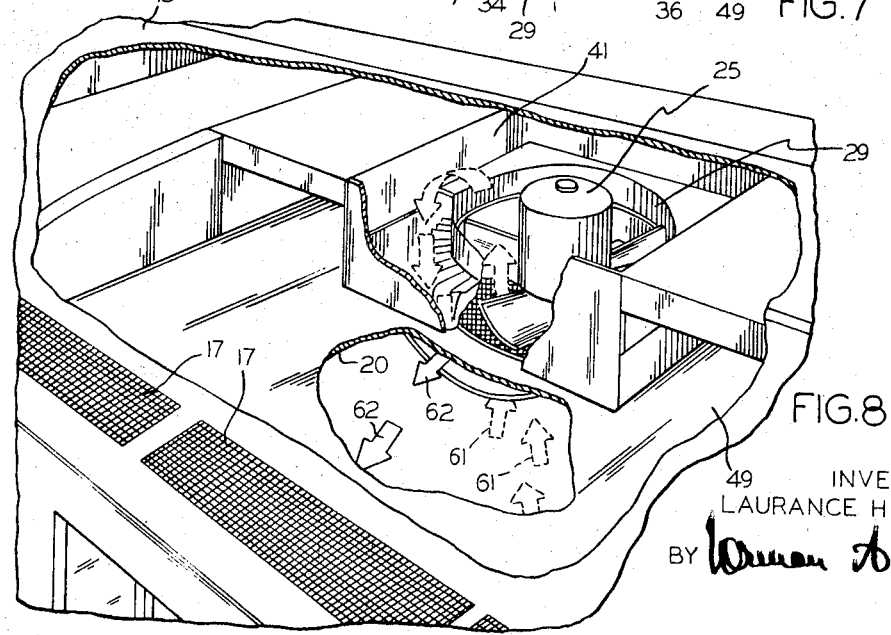
FIG. 8 is a perspective view like FIG. 6 but illustrating the recirculating cycle.

Referring now to FIGS. 5 and 6, the ventilating cycle is illustrated, wherein the movement of air to be exhausted to the atmosphere is indicated by the dotted arrows 59, while the movement of the air to be discharged into the passenger compartment and to be received from the fresh air intake openings is illustrated by the solid line arrows 60. The recirculating cycle is illustrated in FIGS. 7 and 8, wherein the intake air opening of the unit receives air from within the vehicle and this is illustrated by the dotted line arrows 61, and that air is recirculated and discharged through the discharge air opening of the unit as illustrated by the solid line arrows 62. And as seen in FIGS. 5 and 6, the dampers 41 are in open position, while in FIGS. 7 and 8 the dampers are in closed position.

It will be understood that modifications and variations may be effected without departing from the scope of the novel concepts of the present invention, but it is understood that this application is to be limited only by the scope of the appended claims.

The invention is hereby claimed as follows:

1. In a ventilating and air conditioning system for a vehicle having side and end walls, a ceiling and roof thereover, fresh air intake and exhaust air openings in said roof, a floor, and doors in the side walls defining a passenger compartment, a dual flow circulating fan unit mounted in the ceiling and roof, said fan unit comprising a housing, juxtaposed duct means extending from said housing to said air intake and exhaust air openings, an intake passageway, a discharge passageway, a plenum chamber, a fan unit mounted in said housing having a motor and a dual flow fan blade with separate intake and discharge blades, a fan intake opening communicating with said intake blades and said intake passageway, a fan discharge opening communicating with said discharge blades and said discharge passageway, said intake passageway always in communication with said plenum chamber, opening means in said housing communicating with said adjacent duct means, and damper means for said opening means selectively intercommunicating said plenum chamber and said discharge passageway when closed and intercommunicating the plenum chamber with the exhaust air opening duct means and the discharge passageway with the fresh air intake opening duct means when open.

2. In a ventilating and air conditioning system as defined in claim 1, wherein said fan intake and discharge openings communicate with said passenger compartment.

3. In a ventilating and air conditioning system as defined in claim 2, wherein said fan intake opening is substantially circular and said fan discharge opening is substantially annular.

4. In a ventilating and air conditioning system as defined in claim 3, wherein said fan discharge opening is substantially coaxial with said fan intake opening.

5. In a ventilating and air conditioning system as defined in claim 1, wherein the pitch of the intake blades is such as to cause movement of air from the passenger compartment into the fan intake opening, intake passageway and plenum chamber, and the pitch of the discharge blades is such as to cause movement of air from the discharge passageway and fan discharge opening into the passenger compartment.

6. In a ventilating and air conditioning system as defined in claim 1, wherein said opening means includes a pair of openings and said damper means includes a pair of dampers, one for each opening.

7. In a ventilating and air conditioning system as defined in claim 1, and a damper operator for operating said damper means between open and closed position.

8. In a ventilating and air conditioning system as defined in claim 1, and heat exchange means within said housing to condition the air during recycling of the passenger compartment air.

9. In a ventilating and air conditioning system as defined in claim 1, and heater means within said housing to heat the air passing thereover during recycling of the passenger compartment air.

10. In a ventilating and air conditioning system as defined in claim 9, wherein said heater means is located in said discharge passageway.

11. In a ventilating and air conditioning system as defined in claim 9, and thermostat means for controlling the operation of said damper means and heater means.

12. In a ventilating and air conditioning system as defined in claim 6, wherein said openings and dampers are oppositely disposed.

References Cited

UNITED STATES PATENTS

| | | | |
|---|---|---|---|
| 2,595,370 | 5/1952 | Rygard | 98—10 |
| 3,151,538 | 10/1964 | Dean | 98—10 |
| 3,159,089 | 12/1964 | Eggert | 98—14 |
| 3,237,545 | 3/1966 | Gillick et al. | 98—10 |

MEYER PERLIN, *Primary Examiner.*